Dec. 19, 1933.  A. MORTERRA  1,940,430
PEG FOR HOLDING TENTS OR HANGARS OR FOR ANCHORING AIRCRAFT AND THE LIKE
Filed Aug. 18, 1932　2 Sheets-Sheet 1
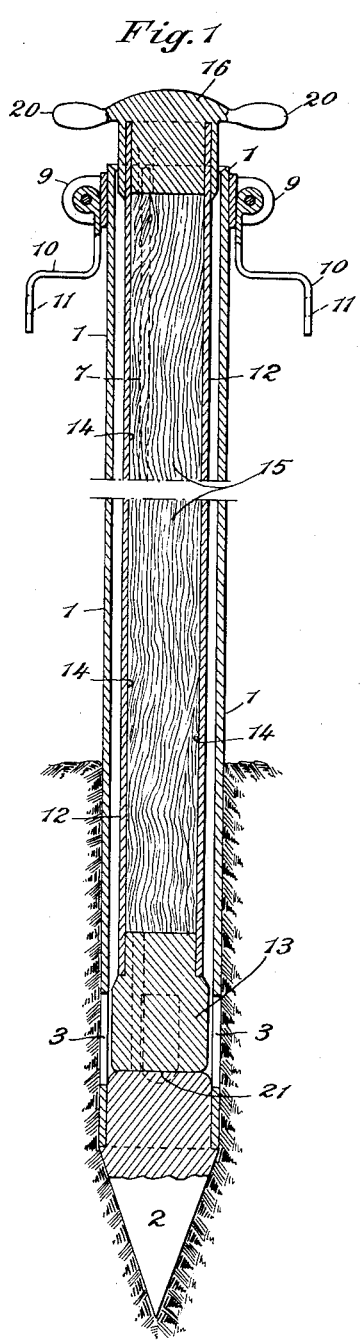
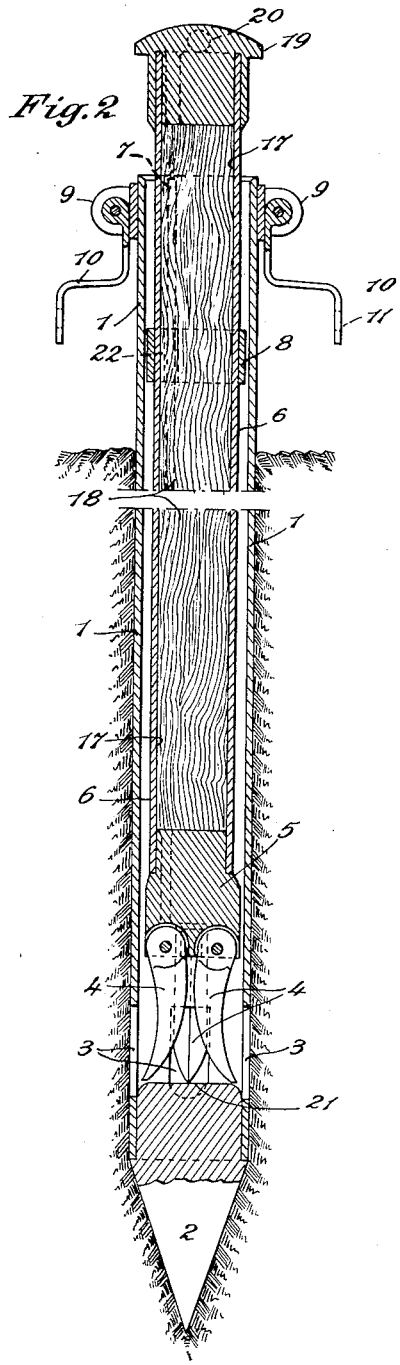
Augusto Morterra
INVENTOR
By [signature]
his Attorney Dec. 19, 1933.  A. MORTERRA  1,940,430
PEG FOR HOLDING TENTS OR HANGARS OR FOR ANCHORING AIRCRAFT AND THE LIKE
Filed Aug. 18, 1932  2 Sheets-Sheet 2
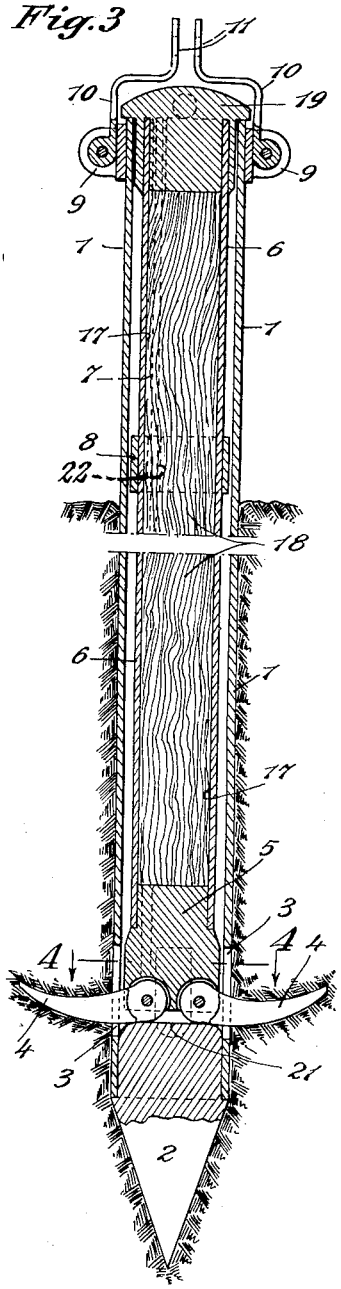
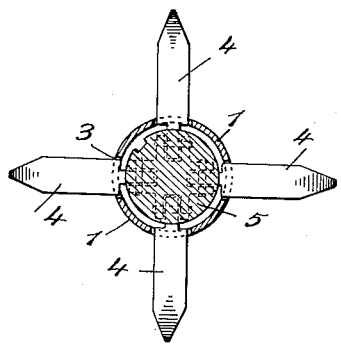
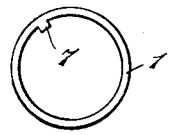
Augusto Morterra
INVENTOR;
By
his Attorney.

Patented Dec. 19, 1933

1,940,430

UNITED STATES PATENT OFFICE 1,940,430

PEG FOR HOLDING TENTS OR HANGARS OR FOR ANCHORING AIRCRAFT AND THE LIKE

Augusto Morterra, Rome, Italy

Application August 18, 1932, Serial No. 629,271, and in Italy June 7, 1932

2 Claims. (Cl. 135—15)

My present invention has for its object to provide an improved peg for holding tents or hangars, or for anchoring aircraft and the like.

The pegs ordinarily used give no secure anchorage in soft soil. Therefore pegs with laterally projecting plates or flanges have been used in order to give the peg a better hold in the soil. However, for sinking such flanged pegs, broad excavations must be made and afterwards filled up, besides the loosened soil does not give so good a hold as naturally hard soil. Furthermore helical pegs have been proposed which offer similar inconveniences, and their sinking requires time and labour.

Pegs for aircraft hangars exposing large surfaces to the wind are particularly subjected to heavy strains and are frequently uprooted, with great damage to the sheltered aircraft.

The improved peg according to my present invention comprises a tube provided near its bottom end with lateral openings through which gripping claws are made to protrude by beating down the top ends of the pegs.

The object of the invention may be attained in various ways one of which I shall describe by way of illustrative example with reference to the annexed drawings in which Fig. 1 shows a vertical axial section of a peg ready for sinking into the ground, Fig. 2 a similar view of a peg sunk into the ground but not yet beaten down for final anchoring, Fig. 3 a similar view of a peg beaten home and securely anchored by the protruding claws, Fig. 4 a section on lines 4—4 of Fig. 3 with protruding claws, and Fig. 5 a cross section of the tube of a peg.

My improved tent peg comprises an outer member or tubular shank 1 ending at bottom in a solid point 2 welded to tube 1. The lower part of tube 1 is provided with lateral apertures 3 through which a plurality of holding claws 4 hinged to the solid bottom part or block 5 of inner member or bolt 12 may be caused to protrude by hammering down bolt 12.

Tube 1 has an inner guiding ledge 7 engaging with a guiding groove provided in a ring 8 fixed to bolt 12.

Tube 1 also has side lugs or eyelets 9 in which metal wings 10 are hinged which latter are swung together as shown in Fig. 3 so that the traction rope by which the tent or hangar flap or the like is to be connected to the peg may be passed through openings 11 of wings 10.

As is seen from Fig. 1, the inner member or bolt 12 is inserted in the outer member or tube 1 of peg, comprising a solid bottom part or block 13 to which a steel tube 14 is suitably fixed, the interior of which is filled with a wood cylinder 15, the projecting top end 16 of which receives the blows of the hammer when the peg is beaten into the ground.

In order to beat the peg into the ground the above said bolt 12 is inserted therein for transmitting the blows from top 16 directly to bottom point 2 of tube 1 or peg proper, without any longitudinal pressure being put on the side walls of tube 1 which, therefore, may be as thin as desired.

After the peg has been sunk into the soil, bolt 12 is withdrawn from tube 1, and in the cylindrical cavity of tube 1 a plug or puncheon 6 with hinged bottom claws 4 is inserted. This plug also comprises an outer steel tube 17, a wooden filler 18, a bottom block 5 and a top head 19.

Both tops 16 and 19, Figs. 1, 2 and 3, have handles 20 for facilitating extraction of the peg or tube 1 from the ground.

When puncheon 6 is beaten down its hinged claws or prongs 4 are opened by anvil 21 so as to protrude through apertures 3 of tube 1 thus forming holding claws in the ground.

In the position shown in Fig. 3 claws 4 protrude into the surrounding soil, being locked in working position by hinged wings 10 which are closed and held together by the traction rope passing through openings 11 of wing 10.

When the peg is to be pulled out from the ground wings 10 are swung open and plug or puncheon 6 is extracted by a slight pull of handle 20, whereupon tube 1 is withdrawn by again swinging together wings 10 and exercising a pull thereon by any suitable means.

In the preferred or normal form of tube 1 four side apertures 3 will be provided, and correspondingly four claws 4 will be hinged to the bottom end or block 5 of puncheon 6. In order to make claws 4 register with apertures 3, puncheon 6 is provided with a ring 8 having a guiding groove 22 engaged by an inner guiding ledge 7 provided on tube 1.

As ledge 7 projects into the interior cavity of tube 1 a corresponding groove is provided in the solid bottom end 13 of bolt 12 and in bottom 5 of puncheon 6.

It is understood that any number of structural modifications and variations are possible within the scope of the invention.

Having now particularly described and ascertained the nature of my said invention and in what manner the same is to be performed, I declare that what I claim is:

1. Peg for anchoring bodies in the ground comprising, in combination, a metal tube, a sharp solid bottom point thereon, the lower part of said tube having apertures immediately above the said sharp bottom point, an inner puncheon, a solid bottom block attached thereto, claws hinged to said solid bottom block, an anvil for opening the claws and protruding same through said apertures on the lowering of said puncheon, and a device for locking said puncheon and claws in working position.

2. In an anchoring peg in accordance with claim 1, and in which side lugs with eyelets are provided at the top of said tube side wings hinged to the said eyelets having holes therein for the passage of a rope connected to the body to be anchored, the said lugs, wings and apertures forming a device for locking the holding claws in protruded working position in the ground surrounding the sunk peg.

AUGUSTO MORTERRA.